(12) United States Patent
Edwards

(10) Patent No.: US 7,264,218 B1
(45) Date of Patent: Sep. 4, 2007

(54) PORTABLE/COLLAPSIBLE SUNSHADE UMBRELLA STAND ASSEMBLY

(75) Inventor: Luis Edwards, 6215 Pembroke Dr., San Diego, CA (US) 92115

(73) Assignee: Luis Edwards, San Diego, CA (US)

( * ) Notice: Subject to any disclaimer, the term of this patent is extended or adjusted under 35 U.S.C. 154(b) by 55 days.

(21) Appl. No.: 11/189,360

(22) Filed: Jul. 26, 2005

Related U.S. Application Data

(60) Provisional application No. 60/591,659, filed on Jul. 27, 2004.

(51) Int. Cl.
*F16M 13/00* (2006.01)
(52) U.S. Cl. .......................... 248/511; 135/16; 248/512
(58) Field of Classification Search .............. 248/511, 248/538, 539, 512, 519, 521; 135/16, 25.1
See application file for complete search history.

(56) References Cited

U.S. PATENT DOCUMENTS

| | | | |
|---|---|---|---|
| 6,722,380 B1 * | 4/2004 | Hafer ........................ 135/16 |
| 6,726,170 B2 * | 4/2004 | Luo .......................... 248/538 |
| 2003/0168573 A1 * | 9/2003 | Luo .......................... 248/512 |

\* cited by examiner

*Primary Examiner*—Ramon O Ramirez

(57) ABSTRACT

A portable/collapsible umbrella stand assembly that would be utilized to provide relief from the heat of the sun. It has an elongated base member that is relatively narrow. A cylindrical support post that extends upwardly from its top surface and a Y-shaped tubular post is telescopically received over the cylindrical support post. The Y-shaped tubular post has a vertically extending primary tubular member and a secondary tubular member extending at an acute angle thereto. The bottom end of the umbrella pole can be removably inserted into either of the respective tubular members. A plurality of stabilizer legs are pivotally attached to the top surface of the base member. They are pivoted transversely to the base member when the stand is setup. In their collapsible state, they are stacked upon one another on the base member.

14 Claims, 2 Drawing Sheets

PORTABLE/COLLAPSIBLE SUNSHADE UMBRELLA STAND ASSEMBLY

This application claims the priority of Provisional Patent Application 60/591,659 filed Jul. 27, 2004.

BACKGROUND OF THE INVENTION

The invention relates to an umbrella stand and more specifically one that would be used to hold an umbrella that would provide protection from the sun. It also provides an umbrella stand that is both portable and collapsible.

Often there is little or no shade at sports fields for players and spectators while watching sporting events and practices. Presently there are umbrella stands that must be screwed into the ground or have spikes that must be driven into the ground on a sports filed or other area. The ground at the sports fields is usually very hard and it is almost impossible to force the umbrella anchors into the ground. Also with the use of artificial turf playing fields, the use of the umbrella holders that must be anchored in the ground is prohibited. There are also other areas that an umbrella stand can be used, for example, at the beach, picnic areas, camp sites, and any area a person would like protection from the sun.

The Mercer U.S. Pat. No. 2,211,283, the Morgulis U.S. Pat. No. 4,832,304 and the Jacinto U.S. Pat. No. 5,152,495 describe umbrella stands with the bottom end having a drill and in the middle of the stand there is a handle with which the drill can be rotated and turned into the ground. The Tizzoni U.S. Pat. No. 5,156,369 describes the hollow cylinder to which there is an umbrella attached wherein the middle of the cylinder there is a shaft and the lower portion of the shaft is a drill. The other end of the shaft is attached to a handle and when the handle is turned the shaft turns causing the drill to turn, screwing itself into the ground and anchoring the hollow cylinder.

The Samuel Jr. U.S. Pat. No. 5,749,386 discloses a self-supporting golf umbrella stand with the bottom end being a spike which can be anchored into the ground by thrusting upon a pivot foot pedal causing the spike to penetrate the ground.

The Lucchesi U.S. Pat. No. 5,502,910 discloses a stand with a vertical pipe which has a spike on the bottom that can be thrust into the ground with a telescoping thrusting mechanism. Afterwards, the thrusting mechanism can be removed and a sign such as a real estate sign can be affixed to the top of the stand.

The Still U.S. Pat. No. 4,524,533 discloses a pole with a disc mounted on the upper portion over which a pipe with a weight is placed to be used as a thrusting mechanism to force the stand securely into the ground. Once the stand is firmly anchored in the ground, the thrusting pipe and weight can be removed and a sign can be affixed on top of the stand, such as a real-estate sign.

The Gerard U.S. Pat. No. 6,412,748 discloses a stand with a spike on the bottom end and a fixed foot pedal protruding from the middle which can be thrust upon forcing the stand to penetrate the ground. A strapping mechanism can then be place around the stand and a beach umbrella pole to hold the umbrella in place.

The Clasen US patent application 20040065802 A1 discloses a sunshine umbrella stand having a spike that is pounded into the ground by a foot pedal hammer.

It is an object of the invention to provide a novel sunshade umbrella stand assembly that does not have a spike that must be drive into the ground or supporting surface.

It also an object of the invention to provide a novel sunshade umbrella stand assembly that is collapsible and portable.

It is also an object of the invention to provide a novel sunshade umbrella stand assembly that is easily folded into a collapsed state for carrying purposes.

It is an additional object of the invention to provide a novel sunshade umbrella stand that is economical to manufacture and market.

SUMMARY OF THE INVENTION

The portable sunshade umbrella stand is collapsible and relative lightweight. The backbone of the structure is an elongated base member normally made from a rigid strip of steel material. Adjacent its rear end is a short cylindrical support post that can be attached by a nut and bolt or welded to the top surface of the base member. An externally threaded pin has its bottom end secured to the top surface of the base member at a position longitudinally spaced from the cylindrical support post. A plurality of elongated stabilizer legs, also preferably made from rigid strips of steel material, each have an aperture adjacent their rear end. These apertures allow the respective stabilizer legs to be pivotally connected to the externally threaded pin. The stabilizer legs when in use would be extended transversely to the respective side edges of the base member. In their stored state, they would be stacked upon each other on top of the base member. A wingnut would be tightened on the eternally threaded pin to lock the legs in their various stored or in use position.

A vertically oriented primary tubular member has its bottom end telescopically received over the top end of the cylindrical support post. An adjustable locking bolt functions as a set screw to lock the Y-shaped tubular post in any angular position within its 360-degree rotational range. The Y-shaped tubular post has a primary tubular member that is substantially vertically oriented. A secondary tubular member is connected to the primary tubular member at an acute angle. Their respective top ends can be utilized to receive the bottom end of a sunshade umbrella pole. Adjustable locking bolts, that function as set screws, pass through the respective apertures in the primary tubular member and secondary tubular member to secure the umbrella pole when it has been erected in either its angular or vertical position.

DESCRIPTION OF THE PREFERRED EMBODIMENT

Figure 1:
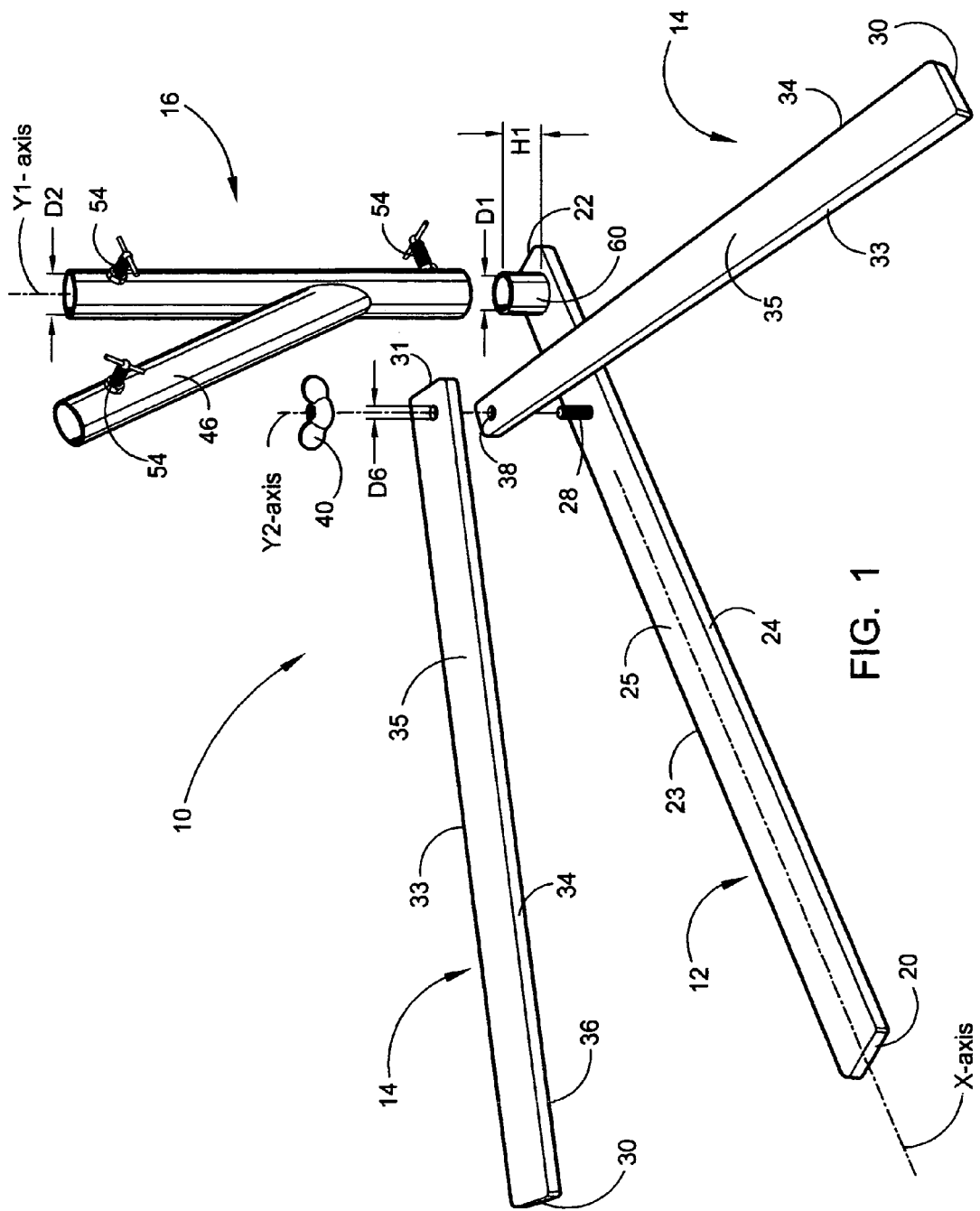
FIG. 1 is an exploded front perspective view of the portable/collapsible sun shade umbrella stand.
Figures 2, 3, 4:
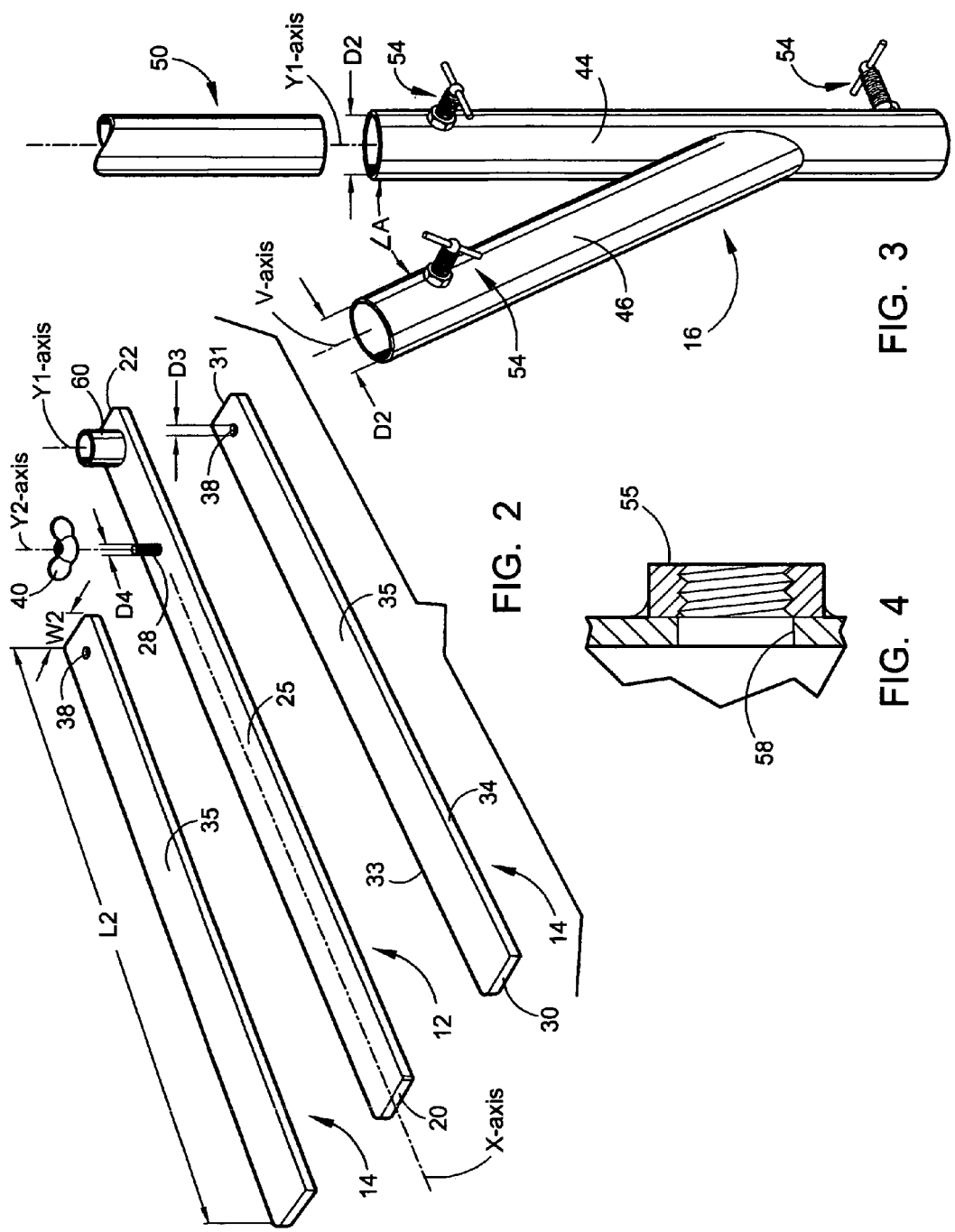
FIG. 2 is a front perspective view showing the different support members laid out prior to assembly.
FIG. 3 is a front perspective view of the Y-shaped tubular post.
FIG. 4 is a cross sectional view of the locking nuts and aligned apertures in the primary and secondary tubular members

The assembled portable/collapsible sun shade umbrella stand assembly will now be described by referring to FIG. 1. The assembled structure is generally designated numeral 10. The primary components are elongated base member 12, elongated stabilizer legs 14 and the Y-shaped tubular post 16. These individual members will be described below.

Base member 12 is an elongated strip of rigid steel having a front end 20, a rear end 22, a right edge 23, a left edge 24. Base member 12 also has a top surface 25, a bottom surface 26, an elongated X-axis, the length L1, a width W1, and a thickness T1. L1 is in the range of 1-5 feet. W1 is in the range of 1-6 inches. T1 is in the range of 0.2-0.6 inches. An externally threaded pin 28 has a vertically extending Y2-axis, a diameter D4 and its bottom end is connected to the top surface 25 of base member 12.

The elongated stabilizer legs 14 would also be preferably made of rigid steel strips. Stabilizer legs 14 have a length L2, a width W2, and a thickness T2. L2 is in the range of 1 to 4 feet. W2 is in the range of 1.6 inches. T2 is in the range of 0.2-0.6 inches. Stabilizer legs 14 have a front end 30, a rear end 31, a right edge 33, a left edge 34, a top surface 35 and a bottom surface 36. Adjacent their respective rear ends, an aperture 38 is formed and it has a diameter D6. D6 is slightly larger than the diameter D4 of pin 28 so that the stabilizer legs are free to pivot easily around pin 28 when they are assembled together. A wing nut 40 allows the stabilizer legs 14 to be stored in their stacked position on top of base member 12. When the leg members are pivoted to their laterally extended positions, wing nut 40 can also be tightened to hold them in their respective position.

Y-shaped tubular post 16 is formed from a vertically oriented primary tubular member 44 and an angularly oriented secondary tubular member 46. Secondary tubular member 46 has its bottom end connected to a primary tubular member at an acute angle A. Angle A is in the range of 10-45 degrees. Primary tubular member 44 has a vertically extending Y1-axis. Secondary tubular member has a longitudinally extending V-axis. The bottom end of an umbrella pole 50 can be telescopically received in either the top end of primary tubular member 44 or angular secondary tubular member 46. Adjustable locking bolts 54 function as set screws that can be tightened against the outer surface of pole 50 to rigidly secure it therein. Adjustable locking bolts 54 have a threaded exterior that can be screwed into nut fastener members 55 that are welded on the outside surface of the respective tubular members. Apertures 58 in the tubular members allow the locking bolts to press against the outer surface of umbrella pole 50.

The rear end of base member 12 has a cylindrical support post 60 connected to top surface 25. Support post 60 has a height H1 and H1 is in the range of 1.0-5.0 inches. Cylindrical post 60 has an outside diameter D1 that is slightly smaller than the inside diameter D2 of the bottom end of primary tubular member 44 so that they can be removably telescoped together. Adjustable locking bolt 54 functions as a set screw in the same manner as previously discussed. Y-shaped tubular post 44 can be rotated throughout a 360-degree range and locked at any desired angle.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention as defined in the appended Claims.

What is claimed is:

1. A portable/collapsible sunshade umbrella stand assembly comprising:

an elongated base member having a front end, a rear end, a left edge, a right edge, a top surface, a bottom surface, a longitudinally extending X-axis, a length L1, a width W1, and a thickness T1;

an upright oriented cylindrical support post having a top end, a bottom end, Y1-axis, and outside diameter D1 and a height H1; said cylindrical support post having said bottom end secured to said top surface of said base member at a predetermined location;

an upright oriented Y-shaped tubular post formed from a vertically oriented primary tubular member and an angularly oriented secondary tubular member; said primary tubular member having a top end, a bottom end, an outer surface, a Y1-axis, an inside diameter D2 and said bottom end being telescopically connected to said cylindrical support post extending upwardly from said top surface of said base member; said angularly oriented secondary tubular member having a top end, a bottom end, a V-axis, an inside diameter D2 and said bottom end being secured to said outer surface of said primary tubular member;

at least one elongated stabilizer leg having a front end, a rear end, a left edge, a right edge, a top surface, a bottom surface, a length L2, a width W2 and a thickness T2;

pivot means for pivotally securing said rear end of said elongated stabilizer leg to said top surface of said base member; said pivot means functions to allow said elongated stabilizer leg to be pivoted from a stored position resting on said top surface of said base member to any functional lateral stabilizing position to the left side or the right side; and said pivot means comprises: a vertically oriented externally threaded pin having a top end, a bottom end, a longitudinally extending Y2-axis, a width D4 and said bottom end is connected to said top surface of said base member; said at least one elongated stabilizer leg has a vertical aperture formed adjacent said rear end of said at least one elongated stabilizer leg; said aperture having a diameter D6 that is greater than D3 so that said elongated stabilizer leg freely pivots about said pin; and a fastener member removably screwed onto said top end of said threaded pin.

2. A portable/collapsible sunshade umbrella stand assembly as recited in claim 1 wherein said base member has a substantially planar bottom surface.

3. A portable/collapsible sunshade umbrella stand assembly as recited in claim 1 wherein said cylindrical support post is positioned adjacent said rear end of said base member.

4. A portable/collapsible sunshade umbrella stand assembly as recited in claim 3 wherein said cylindrical support post has a height H1 in the range of 1.0-5.0 inches.

5. A portable/collapsible sunshade umbrella stand assembly as recited in claim 1 wherein L1 is in the range of 1-5 feet.

6. A portable/collapsible sunshade umbrella stand assembly as recited in claim 5 wherein W1 is in the range of 1-6 inches.

7. A portable/collapsible sunshade umbrella stand assembly as recited in claim 6 wherein T1 in the range of 0.2-0.6 inches.

8. A portable/collapsible sunshade umbrella stand assembly comprising:

an elongated base member having a front end, a rear end, a left edge, a right edge, a top surface, a bottom surface, a longitudinally extending X-axis, a length L1, a width W1, and a thickness T1;

an upright oriented cylindrical support post having a top end, a bottom end, Y1-axis, and outside diameter D1 and a height H1; said cylindrical support post having said bottom end secured to said top surface of said base member at a predetermined location;

an upright oriented Y-shaped tubular post formed from a vertically oriented primary tubular member and an angularly oriented secondary tubular member; said primary tubular member having a top end, a bottom end, an outer surface, a Y1-axis, an inside diameter D2 and said bottom end being telescopically connected to said cylindrical support post extending upwardly from said top surface of said base member; said angularly oriented secondary tubular member having a top end, a bottom end, a V-axis, an inside diameter D2 and said bottom end being secured to said outer surface of said primary tubular member;

at least two substantially identical elongated stabilizer legs each having a front end, a rear end, a left edge, a right edge, a top surface, a bottom surface, a length L2, a width W2 and a thickness T2; and pivot means for pivotally securing said rear end of said elongated stabilizer leg to said top surface of said base member; said pivot means functions to allow said elongated stabilizer leg to be pivoted from a stored position resting on said top surface of said base member to any functional lateral stabilizing position to the left side or the right side.

9. A portable/collapsible sunshade umbrella stand assembly as recited in claim 8 wherein said base member and said stabilizer legs are made of steel.

10. A portable/collapsible sunshade umbrella stand assembly as recited in claim 8 wherein said Y1-axis is substantially perpendicular to said X-axis.

11. A portable/collapsible sunshade umbrella stand assembly as recited in claim 8 wherein said V-axis of said secondary tubular member intersects said Y1-axis of said primarily tubular member at an acute angle A and A is in the range of 10-45 degrees.

12. A portable/collapsible sunshade umbrella stand assembly as recited in claim 8 in combination with a sunshade umbrella pole having a bottom end removably received in said top end of said primary tubular member.

13. A portable/collapsible sunshade umbrella stand assembly as recited in claim 12 further comprising locking means for securing said bottom end of said sunshade umbrella pole in said top end of said primary tubular member.

14. A portable/collapsible sunshade umbrella stand assembly as recited in claim 8 further comprising locking means for securing said bottom end of said primary tubular member to said cylindrical support post.

* * * * *